(12) United States Patent
Kim et al.

(10) Patent No.: US 12,174,001 B2
(45) Date of Patent: Dec. 24, 2024

(54) APPARATUS AND METHOD FOR SEARCHING FOR UNREGISTERED DETONATOR IN DETONATOR LIST AND CONFIRMING ID

(71) Applicant: HANWHA CORPORATION, Seoul (KR)

(72) Inventors: Se Ho Kim, Chungcheongbuk-do (KR); Jeong Ho Choi, Chungcheongbuk-do (KR)

(73) Assignee: HANWHA CORPORATION, Seoul (KR)

( * ) Notice: Subject to any disclaimer, the term of this patent is extended or adjusted under 35 U.S.C. 154(b) by 0 days.

(21) Appl. No.: 17/623,474

(22) PCT Filed: Dec. 21, 2021

(86) PCT No.: PCT/KR2021/019491
§ 371 (c)(1),
(2) Date: Dec. 28, 2021

(87) PCT Pub. No.: WO2023/120759
PCT Pub. Date: Jun. 29, 2023

(65) Prior Publication Data
US 2024/0044630 A1    Feb. 8, 2024

(51) Int. Cl.
*F42D 1/055*       (2006.01)
*F42D 3/04*        (2006.01)
*H04L 9/32*        (2006.01)

(52) U.S. Cl.
CPC .............. *F42D 1/055* (2013.01); *F42D 3/04* (2013.01); *H04L 9/32* (2013.01)

(58) Field of Classification Search
CPC ... F42D 1/055; F42D 3/04; F42D 1/04; F42D 1/08; H04L 9/32; E21D 9/00; F42C 19/08; H04W 56/00
See application file for complete search history.

(56) References Cited

U.S. PATENT DOCUMENTS 5,014,622 A * 5/1991 Jullian ............... F42D 1/055
                                                   102/215
11,105,600 B1 * 8/2021 Berner ............... H04L 12/4135
(Continued)

FOREIGN PATENT DOCUMENTS

CN    112696995 B    9/2021
JP    01-107100 A    4/1989
(Continued)

*Primary Examiner* — Amine Benlagsir
(74) *Attorney, Agent, or Firm* — WHDA, LLP (57) ABSTRACT

An apparatus and method for searching for an unregistered detonator in a detonator list and confirming an ID are disclosed. The apparatus is being provided in control equipment and includes a lower first digit ID confirmation request unit that requests a detonator to confirm an ID for a preset lower first digit, a lower first digit ID confirmation unit that receives response data to the ID confirmation request for the preset lower first digit from the detonator, and confirms the ID for the lower first digit of the detonator through the received response data, a full ID confirmation request unit that requests the detonator for which the ID for the lower first digit is confirmed to confirm a full ID, and a full ID confirmation unit that receives response data to the full ID confirmation request from the detonator and searches for and confirms the full ID of the detonator.

14 Claims, 8 Drawing Sheets

(56) References Cited

U.S. PATENT DOCUMENTS

| | | | |
|---|---|---|---|
| 2003/0101889 A1* | 6/2003 | Hallin | F42D 3/04 |
| | | | 102/206 |
| 2005/0011388 A1 | 1/2005 | Kouznetsov | |
| 2005/0103219 A1* | 5/2005 | McClure | F42D 1/055 |
| | | | 102/311 |
| 2009/0193992 A1 | 8/2009 | Moore | |
| 2020/0173763 A1* | 6/2020 | Howe | F23Q 21/00 |
| 2023/0296364 A1* | 9/2023 | Teowee | F42D 1/055 |
| | | | 102/215 |

FOREIGN PATENT DOCUMENTS

| | | |
|---|---|---|
| JP | 2017-512968 A | 5/2017 |
| KR | 10-0615704 B1 | 8/2006 |
| KR | 10-2016-0137620 A | 11/2016 |
| KR | 10-2020-0077235 A | 6/2020 |
| WO | 01/42732 A1 | 6/2001 |
| WO | 2017/165988 A1 | 10/2017 |
| WO | 2019/147294 A1 | 8/2019 |

* cited by examiner

APPARATUS AND METHOD FOR SEARCHING FOR UNREGISTERED DETONATOR IN DETONATOR LIST AND CONFIRMING ID

TECHNICAL FIELD

One aspect of the present disclosure relates to an apparatus and method for searching for an unregistered detonator in a detonator list and confirming an ID, and more specifically, to an apparatus and method for searching for an unregistered detonator in a detonator list and confirming an ID, for outputting a pulse train corresponding to an ID of a detonator through control equipment, and the unregistered detonator responds based on the pulse train corresponding to its ID to search for and confirm a full ID of the detonator.

BACKGROUND ART

In general, explosives are used for construction such as blasting of bedrock, blasting of abandoned buildings, and the like. That is, blasting objects are classified for each section and a plurality of holes into which explosives are inserted are drilled. After inserting the explosives respectively into the drilled holes, the explosives are connected to a blasting system. The explosives are detonated through an operation of the blasting system to detonate the blasting object.

The blasting system is configured to include a detonator that is a detonating agent for detonating an explosive, a power supply necessary for the operation of the detonator, and a blasting device that transmits a command to the detonator. In this case, an electronic detonator is mainly used as the detonator of the blasting system. The electronic detonator is installed on an explosive side, and a plurality of electronic detonators are connected to one blasting device.

The electronic detonator has a structure in which, when a command is transmitted from the blasting device, a plurality of electronic detonators connected to the blasting device operate simultaneously to detonate explosives at the same time, and a structure in which the plurality of electronic detonators are set with different delay times and the plurality of electronic detonators are sequentially operated to sequentially detonate the explosives.

In this regard. Korean Patent Application Laid-Open Publication No. 2020-0076370 discloses "a wireless blasting system and an operation method thereof".

DISCLOSURE

Technical Problem

In order to solve the above problems, an object of one aspect of the present disclosure is to provide an apparatus and method for searching for an unregistered detonator in a detonator list and confirming an ID, for outputting an ID search command for a preset lower first digit of the detonator and a pulse train corresponding to an ID for the preset lower first digit of the detonator through control equipment and requesting the unregistered detonator to confirm the ID for the preset lower first digit, and confirming the ID of the lower first digit of the corresponding detonator through response data received from the detonator.

In addition, an object of one aspect of the present disclosure is to provide an apparatus and method for searching for an unregistered detonator in a detonator list and confirming an ID, for outputting a full ID confirmation command of the detonator and a pulse train corresponding to a full ID of the detonator through control equipment and requesting the detonator to confirm the full ID including a previously confirmed ID for the lower first digit of the detonator, and comparing a verification code included in response data received from the detonator to search for and confirm the full ID of the detonator.

Technical Solution

In order to accomplish the above object, there is provided an apparatus for searching for an unregistered detonator in a detonator list and confirming an ID according to the present disclosure for achieving the above object, the apparatus for searching for an unregistered detonator in a detonator list and confirming an ID being provided in control equipment, includes a lower first digit ID confirmation request unit that requests a detonator to confirm an ID for a preset lower first digit, a lower first digit ID confirmation unit that receives response data to the ID confirmation request for the preset lower first digit from the detonator, and confirms the ID for the lower first digit of the detonator through the received response data, a full ID confirmation request unit that requests the detonator for which the ID for the lower first digit is confirmed to confirm a fill ID, and a fill ID confirmation unit that receives response data to the full ID confirmation request from the detonator and searches for and confirms the full ID of the detonator by comparing a verification code included in the received response data.

In addition, it is characterized in that the lower first digit ID confirmation request unit outputs an ID search command for the preset lower first digit of the detonator and a pulse train corresponding to the ID for the preset lower first digit of the detonator through the control equipment, and requests the unregistered detonator to confirm the ID for the preset lower first digit.

In addition, it is characterized in that the lower first digit ID confirmation unit confirms the ID of the lower first digit of the corresponding detonator through the response data received from the detonator matching a pulse train sequence corresponding to the ID for the output preset lower first digit of the detonator.

In addition, it is characterized in that the full ID confirmation request unit outputs a full ID confirmation command of the detonator and a pulse train corresponding to a full ID of the detonator through the control equipment, and requests the detonator to confirm the full ID including a previously confirmed ID for the lower first digit of the detonator.

In addition, it is characterized in that the full ID confirmation unit includes a full ID response data receiving unit that receives response data to the full ID confirmation request and a verification code for verifying integrity of the corresponding response data from the detonator, a verification code comparison unit that compares the received verification code with a previously stored verification code, and a full ID search unit that searches for the full ID of the detonator when the verification code matches as a result of the comparison.

In addition, it is characterized in that the apparatus for searching for the unregistered detonator in the detonator list and confirming the ID includes an ID re-search unit that, when the verification code does not match as a result of the comparison by the full ID confirmation unit, requests the detonator to confirm an ID for a preset second lower digit set, and confirms the ID for the second lower digit of the detonator through the received response data to re-search the full ID of the detonator.

In addition, it is characterized in that the ID re-search unit includes a lower second digit ID confirmation request unit that requests the detonator to confirm the ID for the preset lower second digit, a lower second digit ID confirmation unit that receives response data to the ID confirmation request for the preset lower second digit from the detonator, and confirms the ID of the lower second digit of the detonator through the received response data, a full ID re-confirmation request unit that requests the detonator for which the ID of the lower second digit is confirmed to confirm a full ID, and a full ID reconfirmation unit that receives response data to the full ID confirmation request from the detonator and searches for and confirms the full ID of the detonator by comparing the verification code included in the received response data.

In addition, it is characterized in that the lower second digit ID confirmation request unit outputs an ID search command for the preset lower second digit of the detonator and a pulse train corresponding to an added digit compared with the lower first digit of the detonator through the control equipment and requests the unregistered detonator to confirm the ID for the preset second lower digit.

There is provided a method for searching for an unregistered detonator in a detonator list and confirming an ID according to the present disclosure for achieving the above object, the method for searching for an unregistered detonator in a detonator list and confirming an ID being provided in control equipment, includes the steps of requesting, by a lower first digit ID confirmation request unit, a detonator to confirm an ID for a preset lower first digit, receiving, by a lower first digit ID confirmation unit, response data to the ID confirmation request for the preset lower first digit from the detonator, and confirming the ID for the lower first digit of the detonator through the received response data, requesting, by a full ID confirmation request unit, the detonator for which the ID for the lower first digit is confirmed to confirm a full ID, and receiving, by a full ID confirmation unit, response data to the full ID confirmation request from the detonator and searching for and confirming the full ID of the detonator by comparing a verification code included in the received response data.

In addition, it is characterized in that, in the step of requesting the detonator to confirm the ID for the preset lower first digit, an ID search command for the preset lower first digit of the detonator and a pulse train corresponding to the ID for the preset lower first digit of the detonator are output through the control equipment, and the unregistered detonator is requested to confirm the ID for the preset lower first digit.

In addition, it is characterized in that, in the step of receiving response data to the ID confirmation request for the preset lower first digit from the detonator, and confirming the ID for the lower first digit of the detonator through the received response data, the ID of the lower first digit of the corresponding detonator is confirmed through the response data received from the detonator matching a pulse train sequence corresponding to the ID for the output preset lower first digit of the detonator.

In addition, it is characterized in that, in the step of requesting the detonator for which the ID for the lower first digit is confirmed to confirm a full ID, a full ID confirmation command of the detonator and a pulse train corresponding to a full ID of the detonator are output through the control equipment, and requesting the detonator to confirm the full ID including a previously confirmed ID for the lower first digit of the detonator.

In addition, it is characterized in that, the step of receiving response data to the full ID confirmation request from the detonator and searching for and confirming the full ID of the detonator by comparing a verification code included in the received response data, includes the steps of receiving response data to the full ID confirmation request and a verification code for verifying integrity of the corresponding response data from the detonator, comparing the received verification code with a previously stored verification code, and searching for the full ID of the detonator when the verification code matches as a result of the comparison.

In addition, it is characterized in that, the method for searching for the unregistered detonator in the detonator list and confirming the ID includes a step of requesting the detonator to confirm an ID for a preset second lower digit and confirming the ID for the second lower digit of the detonator through the received response data to re-search the full ID of the detonator, when the verification code does not match as a result of the comparison in the step of receiving response data to the full ID confirmation request from the detonator and searching for and confirming the full ID of the detonator by comparing the verification code included in the received response data.

In addition, it is characterized in that, the step of requesting the detonator to confirm the ID for the preset second lower digit and confirming the ID for the second lower digit of the detonator through the received response data to re-search the full ID of the detonator, when the verification codes do not match as a result of the comparison includes the steps of requesting the detonator to confirm the ID for the preset lower second digit, receiving response data to the ID confirmation request for the preset lower second digit from the detonator, and confirming the ID of the lower second digit of the detonator through the received response data, requesting the detonator for which the ID of the lower second digit is confirmed to confirm a full ID, and receiving response data to the full ID confirmation request from the detonator and searching for and confirming the full ID of the detonator by comparing the verification code included in the received response data.

In addition, it is characterized in that, in the step of requesting the detonator to confirm the ID for the preset lower second digit, an ID search command for the preset lower second digit of the detonator and a pulse train corresponding to an added digit compared with the lower first digit of the detonator are output through the control equipment and the unregistered detonator is requested to confirm the ID for the preset second lower digit.

Advantageous Effects

According to an embodiment of the present disclosure, an apparatus and method for searching for an unregistered detonator in a detonator list and confirming an ID for achieving the above object have an effect of quickly and easily searching for an unregistered detonator by outputting the ID search command for the preset lower first digit of the detonator and the pulse train corresponding to ID for the preset lower first digit of the detonator through the control equipment and requesting the unregistered detonator to confirm the ID for a preset lower first digit, and confirming the ID of the lower first digit of the corresponding detonator through response data received from the detonator.

According to an embodiment of the present disclosure, an apparatus and method for searching for an unregistered detonator in a detonator list and confirming an ID for achieving the above object have an effect that the ID of the unregistered detonator can be accurately confirmed, and further, different initial charging is possible for each unregistered primer by outputting the full ID confirmation command of the detonator and the pulse train corresponding to the full ID of the detonator through control equipment and requesting the detonator to confirm the full ID including the previously confirmed ID for the lower first digit of the detonator, and comparing the verification code included in response data received from the to search for and confirm the full ID of the detonator.

As such, in the present disclosure by searching for an unregistered detonator in the detonator list and confirming the ID, it is possible to easily manage a detonator usage history and to respond to the demand for computerized tracking management.

DESCRIPTION OF REFERENCE NUMERALS

100: APPARATUS FOR SEARCHING FOR UNREGISTERED DETONATOR IN DETONATOR LIST AND CONFIRMING ID
110: LOWER FIRST DIGIT ID CONFIRMATION REQUEST UNIT
120: LOWER FIRST DIGIT ID CONFIRMATION UNIT
130: FULL ID CONFIRMATION REQUEST UNIT
140: FULL ID CONFIRMATION UNIT
150: ID RE-SEARCH UNIT

BEST MODE

Since various modifications may be made to the present disclosure and various embodiments may be derived from the present disclosure, specific embodiments are illustrated in the drawings and described in detail.

However, this is not intended to limit the present disclosure to specific embodiments, it should be understood to include all modifications, equivalents and substitutes included in the spirit and scope of the present disclosure. In describing each figure, like reference numerals have been used for like components.

When a component is referred to as being "connected" or "coupled" to another component, it may be directly connected or coupled to the other component, but it should be understood that other elements may exist in the middle. On the other hand, when a component is referred to as being "directly connected" or "directly coupled" to another element, it should be understood that no other component is present in the middle.

The terms used in the present application are only used to describe specific embodiments, and are not intended to limit the present disclosure. The singular expression includes the plural expression unless the context clearly dictates otherwise. It should be understood that, in the present application, terms such as "comprise" or "have" are intended to designate the presence of a feature, number, step, operation, component, part, or combination thereof described in the specification, and do not preclude the possibility of the presence or addition of one or more other features or numbers, steps, operations, components, parts, or combinations thereof.

Hereinafter, with reference to the accompanying drawings, a preferred embodiment of the present disclosure will be described in more detail. Hereinafter, the same reference numerals are used for the same components in the drawings, and redundant descriptions of the same components are omitted.

Figure 1:
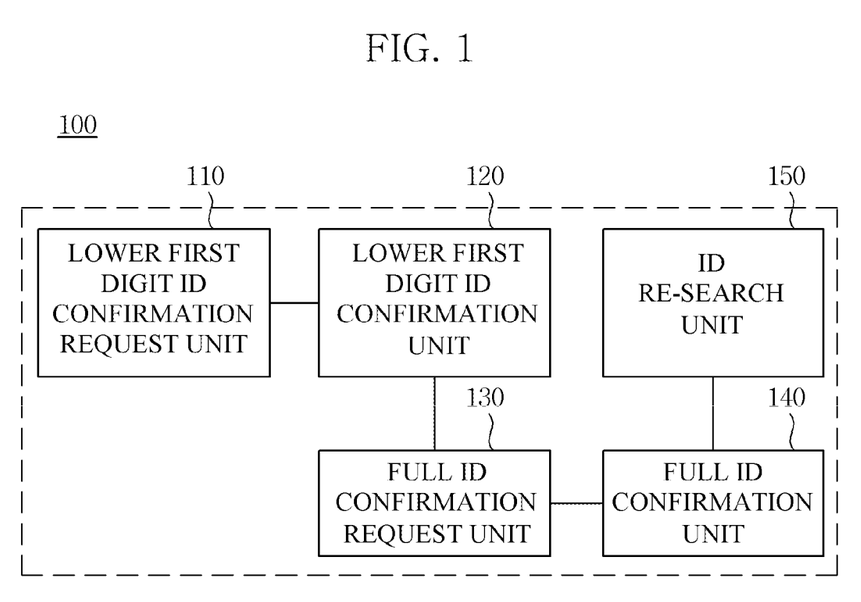
FIG. 1 is a diagram for illustrating a configuration of an apparatus for searching for an unregistered detonator in a detonator list and confirming an ID according to the present disclosure.
Figure 2:
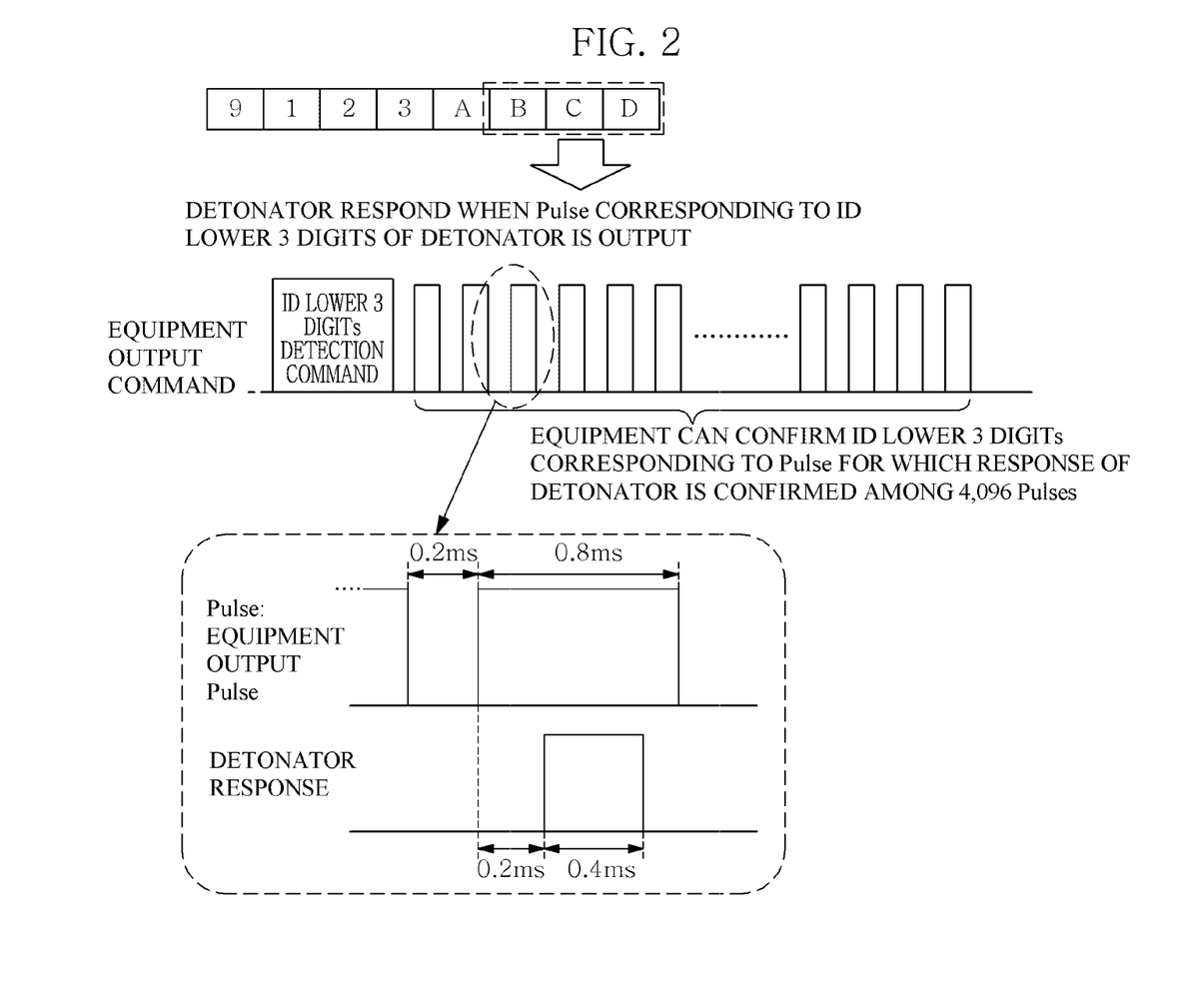
FIG. 2 is a diagram for illustrating the functions of a lower first digit ID confirmation request unit and a lower first digit ID confirmation unit adopted in the apparatus for searching for an unregistered detonator in a detonator list and confirming an ID according to the present disclosure.

FIG. 1 is a diagram for illustrating a configuration of an apparatus for searching for an unregistered detonator in a detonator list and confirming an ID according to the present disclosure and FIG. 2 is a diagram for illustrating the functions of a lower first digit ID confirmation request unit and a lower first digit ID confirmation unit adopted in the apparatus for searching for an unregistered detonator in a detonator list and confirming an ID according to the present disclosure.

When description is made with reference to FIG. 1, an apparatus 100 for searching for an unregistered detonator in a detonator list and confirming an ID according to the present disclosure largely includes a lower first digit ID confirmation request unit 110, a lower first digit ID confirmation unit 120, a full ID confirmation request unit 130, a full ID confirmation unit 140, and an ID re-search unit 150. Here, the apparatus for searching for a detonator not registered in the detonator list and confirming an ID may be provided in control equipment.

The lower first digit ID confirmation request unit 110 requests the detonator to confirm an ID for a preset lower first digit. In the present disclosure, the lower first digit is described as lower three digits of a detonator ID (8 digits in total), but is not limited thereto.

The lower first digit ID confirmation request unit 110 outputs an ID search command for the preset lower first digit of the detonator and a pulse train corresponding to ID for the preset lower first digit of the detonator through the control equipment and requests the unregistered detonator to confirm the ID for the preset lower first digit.

That is, as illustrated in FIG. 2, the lower first digit ID confirmation request unit 110 outputs 4,096 pulse trains along with the ID search command to find out the lower ID three digits (B, C, D parts) of the detonator.

The lower first digit ID confirmation unit 120 receives response data from the detonator to an ID confirmation request for the preset lower first digit from the detonator, and confirms the ID for the lower first digit of the detonator through the received response data.

The lower first digit ID confirmation unit 120 confirms the ID of the lower first digit of the corresponding detonator through the response data received from the detonator matching a pulse train sequence corresponding to the ID for the output preset lower first digit of the detonator.

That is, as illustrated in FIG. 2, the lower first digit ID confirmation unit 120 may confirm the lower ID 3 digits of the detonator corresponding to the pulses, for which the response of the detonator (the response of the detonator of which the lower 3 digits ID match the corresponding pulse train sequence is confirmed, among the output 4,096 pulse trains.

The full ID confirmation request unit 130 requests the detonator for which the ID for the lower first digit is confirmed, to confirm a full ID thereof.

The full ID confirmation request unit 130 outputs a full ID confirmation command of the detonator and a pulse train corresponding to the full ID of the detonator through the control equipment, and requests the detonator to confirm the full ID including the previously confirmed ID for the lower first digit of the detonator.

The full ID confirmation unit 140 receives response data to the full ID confirmation request from the detonator and searches for and confirms the full ID of the detonator (8 digits in total) by comparing the verification code included in the received response data.

The ID re-search unit 150, when the verification codes do not match as a result of the comparison by the full ID confirmation unit 140, requests the detonator to confirm an ID for a preset second lower digit and confirms the ID for the second lower digit of the detonator through the received response data to re-search the full ID of the detonator. In this case, in the present disclosure, the lower second digit is described as lower 4 digits of the detonator ID (8 digits in total), but is not limited thereto.

Figure 3:
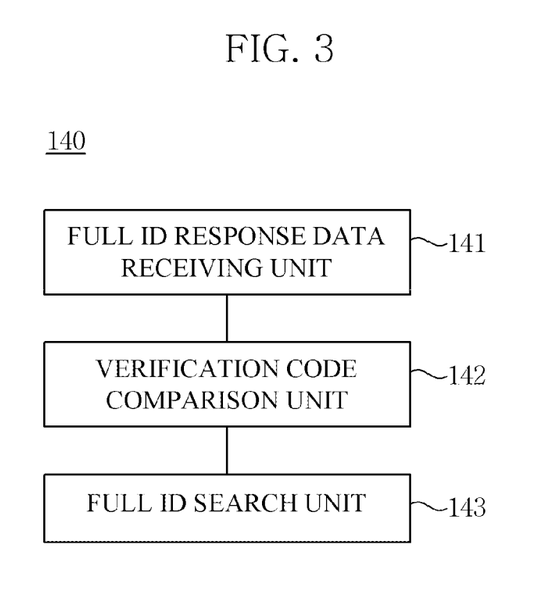
FIG. 3 is a diagram for illustrating a detailed configuration of a full ID confirmation unit adopted in the apparatus for searching for an unregistered detonator in a detonator list and confirming an ID according to the present disclosure.
Figure 4:
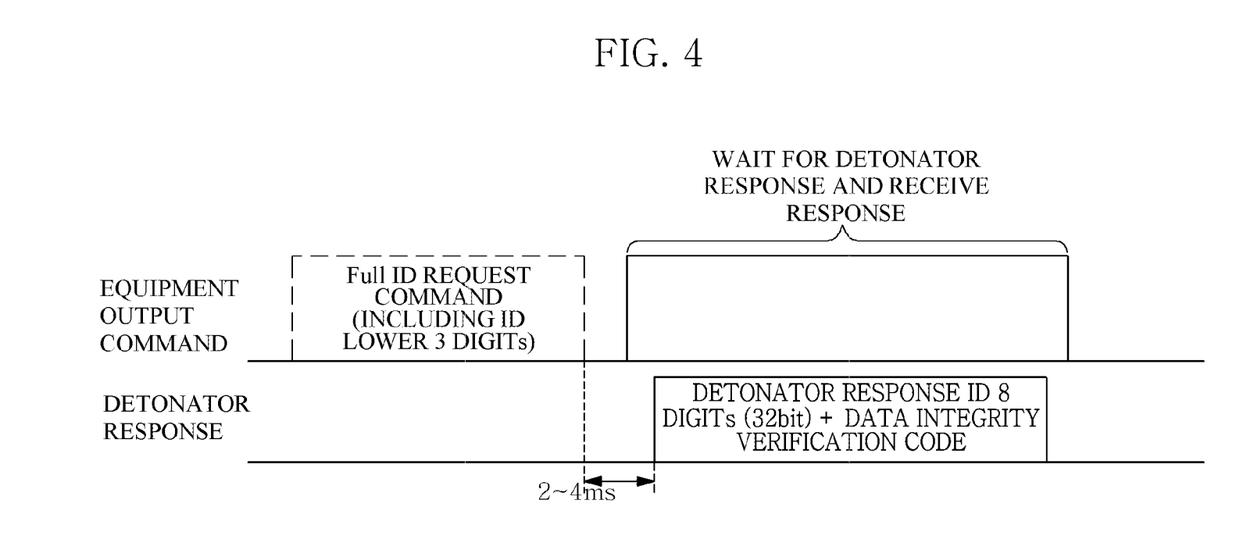
FIG. 4 is a diagram for illustrating a function of the full ID confirmation unit of FIG. 3.

FIG. 3 is a diagram for illustrating a detailed configuration of the full ID confirmation unit adopted in the apparatus for searching for an unregistered detonator in a detonator list and confirming an ID according to the present disclosure and FIG. 4 is a diagram for illustrating a function of the full ID confirmation unit of FIG. 3.

When description is made with reference to FIG. 3, the full ID confirmation unit 140 according to the present disclosure receives response data to the full ID confirmation request from the detonator and searches for and confirms the full ID of the detonator by comparing a verification code included in the received response data.

To this end, the full ID confirmation unit 140 includes a full ID response data receiving unit 141, a verification code comparison unit 142, and a full ID search unit 143.

As illustrated in FIG. 4, the full ID response data receiving unit 141 receives response data to the full ID confirmation request and a verification code for verifying integrity of the corresponding response data from the detonator. In this case, a response condition of the detonator is that the ID for the lower first digit transmitted by being included in the full ID confirmation request matches and the detonator should be an unregistered detonator in the detonator list, and the response data includes the verification code that can verify data integrity along with the full ID of the detonator.

The verification code comparison unit 142 compares the received verification code and a previously stored verification code The full ID search unit 143 searches for the full ID of the detonator when the verification code matches as a result of the comparison result.

Figure 5:
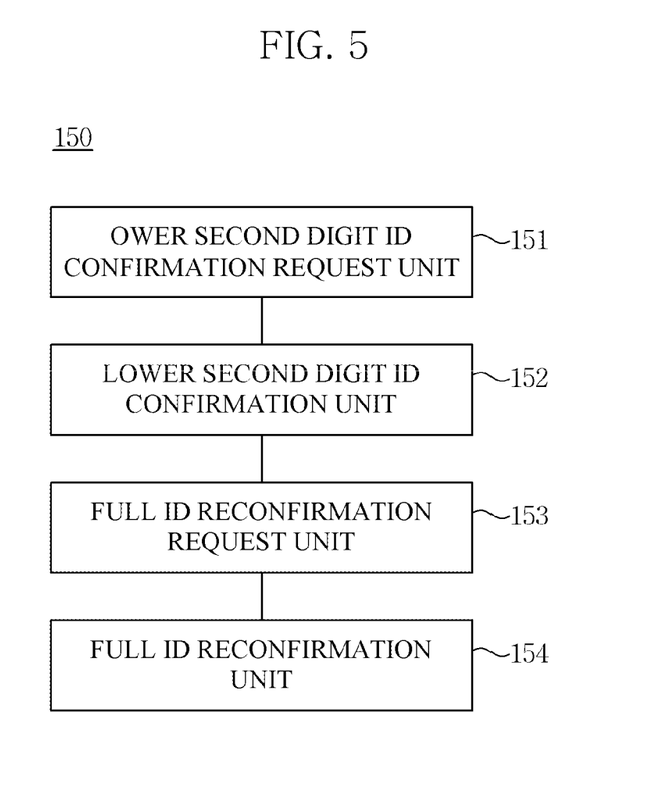
FIG. 5 is a diagram for illustrating a detailed configuration of an ID re-search unit adopted in the apparatus for searching for an unregistered detonator in a detonator list and confirming an ID according to the present disclosure.
Figure 6:
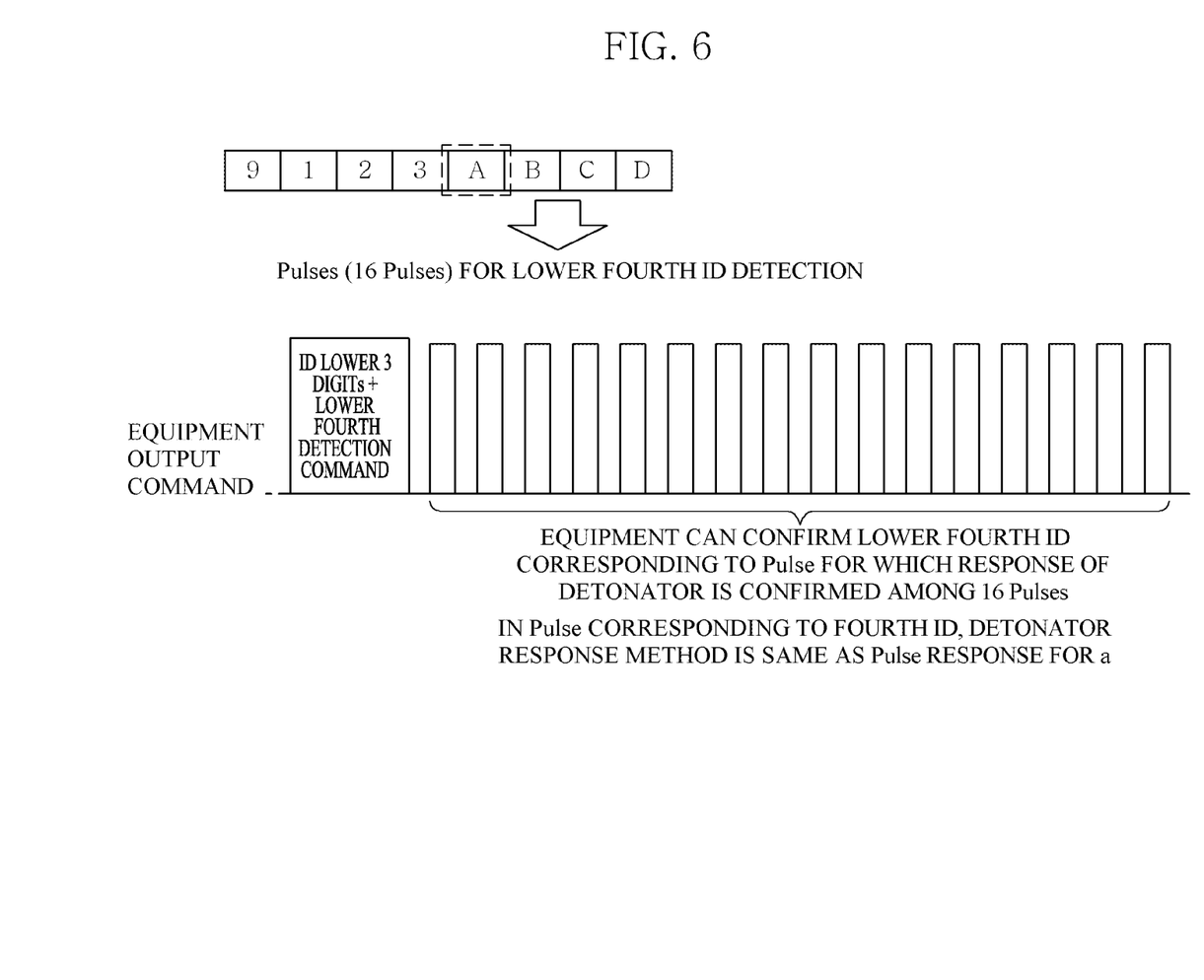
FIG. 6 is a diagram for illustrating a function of the ID re-search unit of FIG. 5.

FIG. 5 is a diagram for illustrating a detailed configuration of an ID re-search unit adopted in the apparatus for searching for an unregistered detonator in a detonator list and confirming an ID according to the present disclosure, and FIG. 6 is a diagram for illustrating the ID re-search unit of FIG. 5.

When description is made with reference to FIG. 5, the ID re-search unit 150 according to the present disclosure, when the verification code does not match as a result of the comparison by the full ID confirmation unit, requests the detonator to confirm the ID for the preset second lower digit, and confirms the ID for the second lower digit of the detonator through the received response data to re-search the full ID of the detonator.

To this end, the ID re-search unit 150 includes a lower second digit ID confirmation request unit 151, a lower second digit ID confirmation unit 152, a full ID re-confirmation request unit 153, and a full ID reconfirmation unit 154.

The lower second digit ID confirmation request unit 151 requests the detonator to confirm the ID for the preset lower second digit. In the present disclosure, the lower second digit is described as lower 4 digits of the detonator ID (8 digits in total), but is not limited thereto. However, the lower second digit means an ID with more digits than the lower first digit mentioned above.

That is, as illustrated in FIG. 6, the second lower digit ID confirmation request unit 151 outputs 16 pulse trains along with an ID search command to find out lower 4 digits of the ID (parts A, B, C, D) of the detonator. That is, only the pulse train corresponding to a digit (i.e., part A) added by one digit compared to the lower first digit is output.

The lower second digit ID confirmation unit 152 receives response data to the ID confirmation request for the preset lower second digit from the detonator, and confirms the ID of the lower second digit of the detonator through the received response data. In this case, the response condition of the detonator is that the ID for the lower first digit transmitted by being included in the full ID confirmation request from the detonator matches, and the detonator should be an unregistered detonator in the detonator list, and when it matches a pulse sequence train corresponding to the digit (i.e., part A) added by one digit from the lower first digit, response data is transmitted in response.

The lower second digit ID confirmation unit 152 confirms the ID of the lower second digit of the corresponding detonator through the response data received from the detonator matching the pulse train sequence that corresponds to the ID for the output preset lower second digit of the detonator.

The full ID re-confirmation request unit 153 requests the detonator for which the ID for the second lower digit is confirmed to confirm the full ID thereof.

The full ID re-confirmation request unit 153 outputs the full ID confirmation command of the detonator and the pulse train corresponding to the full ID of the detonator through the control equipment, and requests the detonator to confirm the full ID including the previously confirmed ID for the first lower digit of the detonator. The response data includes a verification code that can verify data integrity along with the full ID of the detonator.

The full ID reconfirmation unit 154 receives response data to the full ID confirmation request from the detonator and searches for and confirms the full ID of the detonator by comparing the verification code included in the received response data.

The full ID reconfirmation unit 154 receives response data to the full ID confirmation request from the detonator and searches for and confirms the full ID of the detonator (8 digits in total) by comparing the verification code included in the received response data.

Meanwhile, when the verification code does not match as a result of the comparison by the full ID confirmation unit 154, the detonator is requested to confirm the ID for the preset second lower digit, and the ID for the second lower digit of the detonator is confirmed through the received response data and the full ID of the detonator is re-searched. That is, if a range of lower ID digits is increased, the full ID of the detonator can be confirmed through an integrity check, and the ID of the unregistered detonator can be searched.

Figure 7:
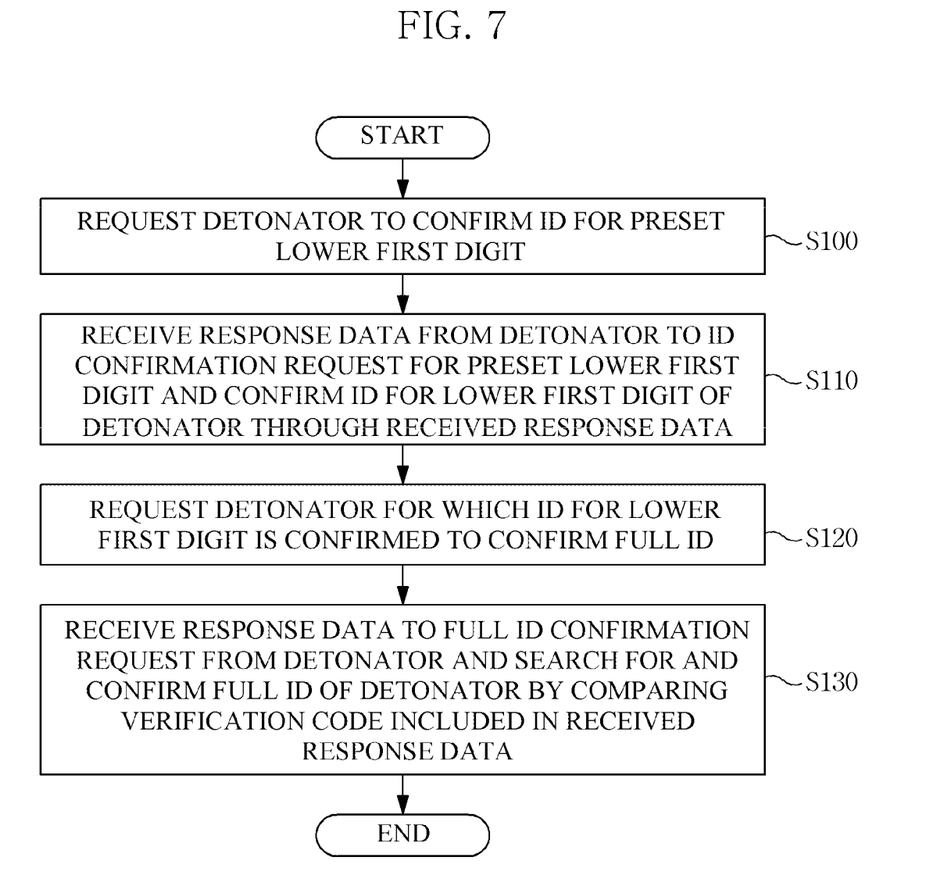
FIG. 7 is a flowchart for illustrating a sequence of a method for searching for an unregistered detonator in a detonator list and confirming an ID according to the present disclosure.

FIG. 7 is a flowchart for illustrating a sequence of a method for searching for an unregistered detonator in a detonator list and confirming an ID according to the present disclosure.

When description is made with reference to FIG. 7, the method for searching for the unregistered detonator in the detonator list and confirming the ID according to the present disclosure is to use the apparatus for searching for the unregistered detonator in the detonator list and confirming the ID described above and confirming the ID, redundant description will be omitted below.

First, a detonator is requested to confirm the ID for a preset lower first digit (S100).

In step S100, an ID search command for the preset lower first digit of the detonator and a pulse train corresponding to an ID for the preset lower first digit of the detonator are output through the control equipment, and the unregistered detonator is requested to confirm the ID for the preset lower first digit. 4,096 pulse trains are outputs along with the ID search command to find out the lower ID three digits (B, C. D parts) of the detonator.

Next, response data to an ID confirmation request for the preset lower first digit is received from the detonator, and the ID for the lower first digit of the detonator is confirmed through the received response data (S110).

In step S110, the ID of the first lower digit of the corresponding detonator is confirmed through the response data received from the detonator matching the pulse tram sequence corresponding to the ID for the output preset lower first digit of the detonator. That is, the lower ID 3 digits of the detonator corresponding to the pulse, for which the response of the detonator is confirmed (the response of the detonator of which the lower 3 digits ID matches the corresponding pulse train sequence), may be confirmed among the output 4,096 pulse trains.

Next, the detonator for which the ID for the lower first digit is confirmed is requested to confirm the full ID thereof (S120).

In step S120, a full ID confirmation command of the detonator and a pulse train corresponding to the full ID of the detonator are output through the control equipment, and the detonator is requested to confirm the full ID including the previously confirmed ID for the first lower digit of the detonator.

Next, response data to the full ID confirmation request is received from the detonator and the full ID of the detonator is searched for and confirmed by comparing the verification code included in the received response data (S130).

Figure 8:
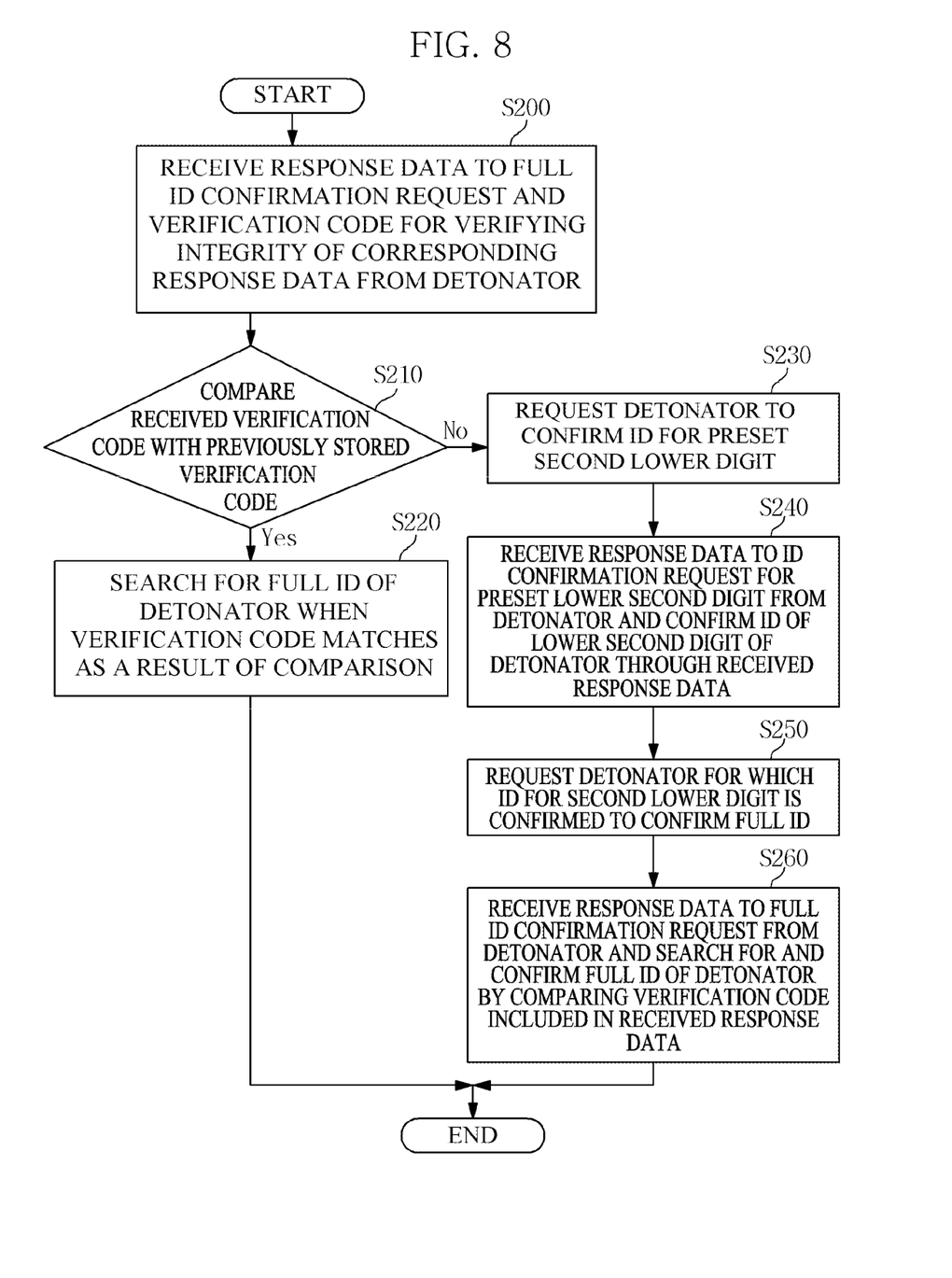
FIG. 8 is a flowchart for illustrating a step of requesting the detonator to confirm the ID for the preset lower second digit to re-search the full ID of the detonator when a verification code does not match as a result of the comparison in the method for searching for the unregistered detonator in the detonator list and confirming the ID.

FIG. 8 is a flowchart for illustrating a step of requesting the detonator to confirm the ID for the preset lower second digit to re-search the full ID of the detonator when the verification code does not match as a result of the comparison in the method for searching for the unregistered detonator in the detonator list and confirming the ID.

When description is made with reference to FIG. 8, in the step of requesting the detonator to confirm the ID for the preset second lower digit to re-search the full ID of the detonator when the verification code does not match, first, the response data to the full ID confirmation request and the verification code for verifying integrity of the response data are received from the detonator for which the ID for the lower first digit is confirmed (S200).

Next, the received verification code and the previously stored verification code are compared with each other (S210).

Next, when the verification code matches as a result of the comparison of step S210, the full ID of the detonator is searched (S220).

On the other hand, when the verification code does not match as a result of the comparison in step S210, the detonator is requested to confirm the ID of the preset lower second digit (S230).

In step S230, the ID search command for the preset lower second digit of the detonator and a pulse train corresponding to the added digit compared with the first lower digit of the detonator are output through the control equipment and the unregistered detonator is requested to confirm the ID for the preset second lower digit.

Next, response data to the ID confirmation request for the preset lower second digit is received from the detonator, and the ID of the lower second digit of the detonator is confirmed through the received response data (S240).

Next, the detonator for which the ID for the second lower digit is confirmed is requested to confirm the full ID (S250).

Next, response data to the full ID confirmation request is received from the detonator and the full ID of the detonator is searched for and confirmed by comparing the verification code included in the received response data (S260).

The functional operations and embodiments related to the subject matter described in this specification may be implemented by digital electronic circuitry or computer software, firmware or hardware, including structures disclosed in this specification and structural equivalents thereof, or in combination of one or more of these components.

The embodiments of the subject matter described in this specification may be implemented as one or more computer program products, i.e., one or more modules of computer program instructions encoded on a tangible program medium for execution by a data processing device or for controlling its operation. The tangible program medium may be a propagating signal or a computer-readable medium. The propagating signal is an artificially generated signal, e.g., a machine-generated electrical, optical or electromagnetic signal, that is generated to encode information for transmission to an appropriate receiver device for execution by a computer. The computer-readable medium may be a machine-readable storage device, a machine-readable storage board, a memory device, a combination of materials that affect a machine-readable propagating signal, or a combination of one or more of these components.

A computer program (also known as a program, software, software application, script, or code) may be written in any form of programming languages, including a compiled or interpreted language or a priori or procedural language, and may be deployed in any form, including standalone programs or modules, components, subroutines, or other units suitable for use in a computer environment.

The computer program does not necessarily correspond to a file in a file device. The program may be stored in a single file provided to a requested program, in multiple interactive files (e.g., a file that stores one or more modules, subprograms, or portions of code), or in portions (e.g., one or more scripts stored within a markup language document) of a file that hold other programs or data.

The computer program may be deployed to be executed on one computer or multiple computers located at one site or distributed across multiple sites and interconnected by a communications network.

Additionally, the logic flows and structural block diagrams described in this patent document are intended to describe corresponding functions supported by the disclosed structural means, corresponding acts supported by steps, and/or specific methods, and can also be used to set up corresponding software structures and algorithms and their equivalents.

The processes and logic flows described in this specification can be performed by one or more programmable processors executing one or more computer programs to execute functions by operating on received data and generating outputs.

Processors suitable for execution of the computer program include, e.g., both general and special purpose microprocessors and any one or more processors of any form of digital computer. In general, the processor may receive instructions and data from a read-only memory or a random access memory, or both.

Essential elements of a computer are one or more memory devices for storing instructions and data and a processor for executing instructions. In addition, the computer may be generally operably coupled to one or more mass storage devices for storing data, e.g., magnetic, magneto-optical disks or optical disks to receive data therefrom, or transmit data thereto, or to perform both such operations, or may include them. However, the computer does not need to have such a device.

The description made herein presents the best mode of the invention, and provides examples to illustrate the invention and to enable those skilled in the art to make or use the invention. The specification thus prepared does not limit the present disclosure to the specific terms presented.

Therefore, although the present disclosure has been described in detail with reference to the examples described above, those skilled in the art may make modifications, changes, and modifications to these examples without departing from the scope of the present disclosure. In short, it should be noted that, in order to achieve the intended effect of the present disclosure, it is not necessary to separately include all the functional blocks illustrated in the drawings or to follow all the orders illustrated in the drawings in the illustrated order, and even if not, they may fall within the technical scope of the present disclosure set forth in the claims.

The invention claimed is:

1. An apparatus for searching for an unregistered detonator in a detonator list and confirming a first ID of the unregistered detonator, the apparatus being provided in control equipment, the apparatus comprising:
    a lower first digit ID confirmation request unit that requests a detonator to confirm an ID for a preset lower first digit from the detonator;
    a lower first digit ID confirmation unit that receives response data for the request to confirm the ID for the preset lower first digit from the detonator, and confirms the ID for the preset lower first digit of the detonator through the received response data for the request to confirm the ID for the preset lower first digit;
    a full ID confirmation request unit that requests the detonator for which the ID for the preset lower first digit is confirmed to confirm a full ID; and
    a full ID confirmation unit that receives response data for the request to confirm the full ID from the detonator and searches for and confirms the full ID of the detonator by comparing a verification code included in the received response data for the request to confirm the full ID,
    wherein the full ID confirmation unit includes:
    a full ID response data receiving unit that receives response data, which includes the verification code that can verify data integrity along with the full ID of the detonator, to the request to confirm the full ID from the detonator,
    a verification code comparison unit that compares the verification code in the received response data for the request to confirm the full ID with a previously stored verification code, and
    a full ID search unit that searches for the full ID of the detonator when the verification code that is included in the received response data for the request to confirm the full ID matches with the previously stored verification code as a result of the comparison of the verification code in the received response data for the request to confirm the full ID with the previously stored verification code, and
    wherein a response condition of the detonator for the request to confirm the full ID of the full ID confirmation request unit is that the ID for the preset lower first digit transmitted by being included in the request to confirm the full ID matches and the detonator is the unregistered detonator in the detonator list, and the response data for the request to confirm the full ID includes the verification code that can verify the data integrity along with the full ID of the detonator.

2. The apparatus according to claim 1, wherein the lower first digit ID confirmation request unit outputs an ID search command for the preset lower first digit of the detonator and a pulse train corresponding to the ID for the preset lower first digit of the detonator through the control equipment, and requests the unregistered detonator to confirm the ID for the preset lower first digit.

3. The apparatus according to claim 1, wherein the lower first digit ID confirmation unit confirms the ID of the preset lower first digit of the detonator through the response data to the request to confirm the ID for the lower first digit ID received from the detonator matching a pulse train sequence corresponding to a second ID for an output preset lower first digit of the detonator.

4. The apparatus according to claim 1, wherein the full ID confirmation request unit outputs a full ID confirmation command of the detonator and a pulse train corresponding to the full ID of the detonator through the control equipment, and requests the detonator to confirm the full ID for the request to confirm the full ID including a previously confirmed ID for the preset lower first digit of the detonator.

5. The apparatus according to claim 1, further comprising:
    an ID re-search unit that, when the verification code does not match as a result of the comparison by the full ID confirmation unit, requests the detonator to confirm a second ID for a preset lower second digit, and confirms the second ID for the preset lower second digit of the detonator through the received response data for the request to confirm the second ID for the preset lower second digit to re-search the full ID of the detonator.

6. The apparatus according to claim 5, wherein the ID re-search unit includes:
a lower second digit ID confirmation request unit that requests the detonator to confirm the second ID for the preset lower second digit,
a lower second digit ID confirmation unit that receives response data to the request to confirm the second ID for the preset lower second digit from the detonator, and confirms the second ID of the preset lower second digit of the detonator through the received response data for the request to confirm the second ID for the preset lower second digit,
a full ID reconfirmation request unit that requests the detonator for which the second ID of the lower second digit is confirmed reconfirm a full second ID, and
a full ID reconfirmation unit that receives response data to the request to reconfirm the full second ID from the detonator and searches for and reconfirms the full second ID of the detonator by comparing a verification code included in the received response data to the request to reconfirm for the full second ID.

7. The apparatus according to claim 6, wherein the lower second digit ID confirmation request unit outputs an ID search command for the preset lower second digit of the detonator and a pulse train corresponding to an added digit compared with the lower first digit of the detonator through the control equipment and requests the unregistered detonator to confirm the second ID for the preset lower second digit.

8. A method for searching for an unregistered detonator in a detonator list and confirming a first ID of the unregistered detonator, the method being provided in control equipment, the method comprising:
requesting, by a lower first digit ID confirmation request unit, a detonator to confirm an ID for a preset lower first digit;
receiving, by a lower first digit ID confirmation unit, response data to the request to confirm the ID for the preset lower first digit from the detonator, and confirming the ID for the preset lower first digit of the detonator through the received response data for the request to confirm the ID for the preset lower first digit from the detonator;
requesting, by a full ID confirmation request unit, the detonator for which the ID for the lower first digit is confirmed to confirm a full ID; and
receiving, by a full ID confirmation unit, response data to the request to confirm the full ID from the detonator and searching for and confirming the full ID of the detonator by comparing a verification code included in the received response data for the request to confirm the full ID from the detonator,
wherein the receiving response data to the request to confirm the full ID from the detonator and searching for and confirming the full ID of the detonator by comparing the verification code included in the received response data for the request to confirm the full ID includes:
said receiving the response data to the request to confirm the full ID, which includes the verification code that can verify data integrity along with the full ID IDS of the detonator to the request to confirm the full ID from the detonator;
comparing the verification code in the received response data for the request to confirm the full ID with a previously stored verification code; and
searching for the full ID of the detonator when the verification code that is included in the received response data matches with the previously stored verification code as a result of the comparison of the verification code with the previously stored verification code, and
wherein a response condition of the detonator for the request to confirm the full ID of the full ID confirmation request unit is that the ID for the lower first digit transmitted by being included in the request to confirm the full ID matches and the detonator is the unregistered detonator in the detonator list, and the response data for the request to confirm the full ID includes the verification code that can verify the data integrity along with the full ID of the detonator.

9. The method according to claim 8, wherein, in requesting the detonator to confirm the ID for the preset lower first digit,
an ID search command for the preset lower first digit of the detonator and a pulse train corresponding to the ID for the preset lower first digit of the detonator are output through the control equipment, and the unregistered detonator is requested to confirm the ID for the preset lower first digit.

10. The method according to claim 8, wherein, in said receiving the response data to the request to confirm the ID for the preset lower first digit from the detonator, and
confirming the ID for the lower first digit of the detonator through the received response data for the request to confirm the ID for the preset lower first digit,
the ID of the lower first digit of the detonator is confirmed through the response data to the request to confirm the ID for the lower first digit ID received from the detonator matching a pulse train sequence corresponding to a second ID for an output preset lower first digit of the detonator.

11. The method according to claim 8, wherein in requesting the detonator for which the ID for the lower first digit is confirmed to confirm the full ID,
a full ID confirmation command of the detonator and a pulse train corresponding to the full ID of the detonator are output through the control equipment to request the detonator to confirm the full ID including a previously confirmed ID for the lower first digit of the detonator.

12. The method according to claim 8, further comprising:
requesting the detonator to confirm a second ID for a preset lower second digit and confirming the second ID for the lower second digit of the detonator through the received response data for the request to confirm the second ID for the preset lower second digit to re-search the full ID of the detonator, when the verification code does not match as a result of the comparison in said receiving the response data to the request to confirm the full ID from the detonator and searching for and confirming the full ID of the detonator by comparing the verification code included in the received response data for the request to confirm the full ID.

13. The method according to claim 12, wherein requesting the detonator to confirm the second ID for the preset lower second digit and confirming the second ID for the lower second digit of the detonator through the received response data for the request to confirm the second ID for the preset lower second digit to re-search the full ID of the detonator, when the verification code do not match as a result of the comparison includes:

requesting the detonator to confirm the second ID for the preset lower second digit;

receiving the response data to the request to confirm the second ID for the preset lower second digit from the detonator, and confirming the second ID of the lower second digit of the detonator through the received response data for the request to confirm the second ID for the preset lower second digit;

requesting the detonator for which the second ID of the lower second digit is confirmed reconfirm the full ID; and     receiving the response data to the request to reconfirm the full ID from the detonator and searching for and reconfirming the full ID of the detonator by comparing a verification code included in the received response for the request to reconfirm the full ID.

14. The method according to claim 13, wherein in requesting the detonator to confirm the second ID for the preset lower second digit,     an ID search command for the preset lower second digit of the detonator and a pulse train corresponding to an added digit compared with the lower first digit of the detonator are output through the control equipment and the unregistered detonator is requested to confirm the second ID for the preset lower second digit.

* * * * *